(12) United States Patent
Hartwich (10) Patent No.: US 8,391,318 B2
(45) Date of Patent: Mar. 5, 2013

(54) COMMUNICATION SYSTEM INCLUDING A DATA BUS AND MULTIPLE USER NODES CONNECTED THERETO, AND METHOD FOR OPERATING SUCH A COMMUNICATION SYSTEM

(75) Inventor: Florian Hartwich, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 79 days.

(21) Appl. No.: 12/735,952

(22) PCT Filed: Mar. 4, 2009

(86) PCT No.: PCT/EP2009/052535
§ 371 (c)(1),
(2), (4) Date: Nov. 3, 2010

(87) PCT Pub. No.: WO2009/109592
PCT Pub. Date: Sep. 11, 2009

(65) Prior Publication Data
US 2011/0038388 A1 Feb. 17, 2011

(30) Foreign Application Priority Data
Mar. 7, 2008 (DE) .................. 10 2008 000 562

(51) Int. Cl.
*H04J 3/07* (2006.01)
(52) U.S. Cl. ........................ 370/503; 370/294
(58) Field of Classification Search .................. None
See application file for complete search history.

(56) References Cited

U.S. PATENT DOCUMENTS

2003/0226065 A1* 12/2003 Shingaki .................. 714/43
2004/0156462 A1 8/2004 Fuehrer et al.
2005/0024111 A1 2/2005 Ruat et al.
2005/0251701 A1* 11/2005 Fredriksson ............... 713/500
2006/0123176 A1 6/2006 Fredriksson et al.

FOREIGN PATENT DOCUMENTS

| EP | 1 367 762 | 12/2003 |
| EP | 1 564 925 | 8/2005 |
| JP | 2000-196700 | 7/2000 |
| WO | 2008/006613 | 1/2008 |

OTHER PUBLICATIONS

Philips Semiconductors: "Application Note. P82C150 Serial Linked I/O (SLIO) Device. AN94088" Internet Citation Jan. 1, 1995, p. 52PP, XP007908912, Retrieved from the Internet: URL :http://www.nxp.com/acrobat_download/applicationnotes/AN94088_1.pdf> [retrieved on Jun. 18,2009 ] cited in the application abstract ; figures 13-18, p. 19, paragraph 4.2, p. 22, paragraph 5-p. 26, last paragraph.

* cited by examiner

*Primary Examiner* — David Oveissi
(74) *Attorney, Agent, or Firm* — Kenyon & Kenyon LLP (57) ABSTRACT

A method and system of communication capable of expediting a calibration process which requires a data bus, multiple user nodes connected to the data bus, and data frames for data transmission that each include a data field and/or a control field and a check sum field. One user has a high-precision clock generator, and the remaining users have a clock generator having a lower precision. The users having the lower precision clock generator calibrate the lower precision clock generator to a system clock signal of the data bus, taking into account information contained in received calibration messages already present on the data bus. Expedited calibration requires the system clock signal period to be set according to a series of measurements and uses any given messages transmitted via the data bus as calibration messages, thus conserving bandwidth on the data bus.

20 Claims, 4 Drawing Sheets

COMMUNICATION SYSTEM INCLUDING A DATA BUS AND MULTIPLE USER NODES CONNECTED THERETO, AND METHOD FOR OPERATING SUCH A COMMUNICATION SYSTEM

FIELD OF THE INVENTION

The present invention relates to a communication system having a data bus and multiple user nodes connected to the data bus. Data transmission via the data bus takes place in data frames, each having at least one data field and at least one check sum field. At least one of the users has a high-precision clock generator, and the remaining users have a clock generator having a lower precision than the high-precision clock generator. During operation of the communication system, calibration messages are present on the data bus. At least one of the users having the imprecise clock generator receives a calibration message, and has a calibration control system for calibrating the imprecise clock generator to a system clock signal of the data bus, taking into account information contained in the received calibration message. Moreover, the present invention relates to a method for operating such a communication system.

BACKGROUND INFORMATION

A simple and cost-effective variant of the controller area network (CAN) bus, the so-called serial linked IO (SLIO) CAN, is discussed in the related art. The SLIO CAN was developed by Robert Bosch GmbH, and is manufactured and marketed by Philips Semiconductors under the name "P82C150." More detailed information concerning the SLIO may be obtained from the Philips Semiconductors "P82C150" specification sheet dated Jun. 19, 1996. In the SLIO, an association of a high-precision clock generator, for example a quartz crystal, with each user node of the communication system is dispensed with. Only the master SLIO user node(s) has/have such a precise clock generator. The remaining SLIO user nodes operate using an internal RC oscillator as a clock generator, which is able to operate without external elements such as quartz crystals or ceramic resonators, and which therefore is relatively imprecise. To obtain a system clock signal which is sufficiently precise for the CAN communication, each of the SLIO user nodes contains a calibration control system which calibrates the relatively imprecise RC clock. The calibration for the SLIO CAN is carried out in two steps, and is subdivided into a rough calibration and a subsequent fine calibration. In rough calibration, the calibration control system starts by searching the received bit patterns on the CAN bus for the smallest distance between two consecutive edges from recessive to dominant (measured in oscillator periods). This distance is assumed to be the time for two CAN bit times, and the clock divider, which generates the system clock signal of the CAN protocol control system, is set in such a way that the CAN protocol control system operates at maximum precision using this CAN bit time. The search for smaller distances between two consecutive edges from recessive to dominant is discontinued as soon as the CAN protocol control system, which operates using the instantaneously set system clock signal, accepts a received CAN message as valid; the rough calibration is thus concluded.

Fine calibration of the SLIO CAN is carried out using special calibration messages which are regularly transmitted via the CAN bus by one or multiple SLIO masters which have a high-precision clock generator, for example in the form of a quartz crystal. The calibration message is uniquely defined as a calibration message on the basis of its message identifier (identifier field of the data frame). In addition, the content of the calibration message, in particular the content of the data field of the message, is predetermined for the SLIO CAN. The calibration message includes two edges, from recessive to dominant, spaced exactly 32 bits apart. When the first edge from recessive to dominant occurs, a counter for the oscillator clock signals is started in the SLIO users having an RC oscillator, and it is stopped when the second edge occurs. For the SLIO CAN it is also predetermined that ten system clock signals (CAN time quanta; $t_q$) correspond to one CAN bit time. This is specified in the SLIO user nodes in the form of hardware. After receipt of the 32 bits in the calibration message, the counter should therefore be at a value which corresponds to 320 system clock signals. A divider ratio of a clock divider is then ascertained which converts the oscillator clock signal to a system clock signal. The denominator of the clock ratio is always 320 for the SLIO CAN. The actual counter content following the 32 bits is contained in the counter.

Thus, a disadvantage of the known SLIO is that special calibration messages must be provided which occupy a portion of the bandwidth of the CAN bus, and cannot be used for transmitting the actual payload data. Therefore, less bandwidth is available for transmitting the actual payload data. Another disadvantage of the known SLIO results from the fact that by definition, an SLIO user node is not able to transmit, including acknowledge bits (ACK), if it has received no valid calibration messages. As a result, in the event that a network is composed only of one SLIO master, which transmits calibration messages, and multiple SLIO nodes having RC oscillators, the SLIO master first enters into a so-called error passive state before communication via the CAN bus is able to start. As long as the SLIO master is in the so-called error active state, it destroys its own calibration messages, using active error frames, due to missing acknowledge bits. In such a case, a relatively long period of time passes until communication via the CAN bus may be started. In some cases it is even impossible to start communication since no synchronization of the SLIO user nodes takes place. In practice, these problems are controllable only with great difficulty, and require a high level of effort and expense.

Based on the described related art, the object of the present invention is to propose, in a communication system which has user nodes having relatively imprecise clock generators, a simple and cost-efficient option which allows the clock generators of the user nodes to be quickly and reliably calibrated to a system clock signal.

SUMMARY OF THE INVENTION

To achieve this object, it is proposed, based on the communication system of the type referenced at the outset, that the number (NTQ) of system clock signals contained in a bit time be freely configurable, that the calibration control system be suitable for measuring in oscillator periods a distance (NOPN) between a first edge in the data field or in the control field of a received data frame and another edge in a field of the received data frame, counting the number (NB) of bits between these two edges, and setting a clock divider, which generates a system clock signal of a data bus protocol control system of the at least one user, using the imprecise clock generator, in such a way that a system clock signal period has a length of NOPN/(NB·NTQ) oscillator periods. The high-precision clock generator includes a high-precision quartz crystal or a microelectric mechanical system (MEMS) resonator, for example. The less precise clock generator includes an RC oscillator, for example. Of course, it would also be possible to simply use less expensive, and therefore more imprecise, quartz crystals or ceramic resonators as less precise oscillators. In the present case the term "high-precision" merely means that the clock generator is more precise than the imprecise clock generator, and that the clock generator is precise enough to predetermine the system clock signal for the communication system.

Thus, according to the exemplary embodiments and/or exemplary methods of the present invention it is proposed that the number of system clock signals contained in a bit time is freely selected. This may also result in a clock divider having a fractional rational divider ratio. This measure allows special calibration messages to be dispensed with. Instead, practically any given message which is transmitted via the data bus may be used for calibrating the user nodes. Thus, data bus bandwidth is no longer lost for the transmission of special calibration messages. The calibration messages may be generated by one of the user nodes, using a high-precision clock generator, and/or sent via the data bus.

For purposes of the calibration, the calibration control system of the at least one user node to be calibrated measures a distance (NOPN) between a first edge in the data field of a received data frame and another edge in a field of the received data frame. The distance (NOPN) is measured in oscillator periods. The calibration control system also counts the number (NB) of bits between these two edges, and sets a clock divider in such a way that a system clock signal period has a length of NOPN/(NB·NTQ) oscillator periods. The clock divider generates a system clock signal of a data bus protocol control system of the at least one user to be calibrated. The option of using a clock divider having a fractional rational divider ratio allows any given edges in any given received data frame to be used for calibrating the user. However, the edges taken into account may be spaced a maximum distance apart, since the relative effect of measuring errors of an oscillator period, expressed as a percentage, is less for a large, compared to a small, distance between the edges. Since according to the present invention no bandwidth is lost for transmitting the calibration messages via the data bus, the messages which are used for calibrating the users may be particularly long, so that the calibration is particularly accurate.

Using the clock divider having a fractional rational divider ratio, it is possible to set any given bit timing configuration, and to search each received message for the pair of edges which is best suited, i.e., spaced the farthest distance apart, which may be from recessive to dominant. It need only be ensured that both edges which are taken into account come from the same user node (transmitter). For the first edge, this is provided when the arbitration is concluded (at the beginning of the control field), and for the second edge, when it is measured prior to the end of the check sum sequence (prior to the CRC delimiter in the check sum field).

The considered first edge, which initiates the start of a counter, may be the first edge which occurs in the data field of the received data frame. An edge in the control field could also be used as the first edge, but an edge from recessive to dominant is not present in the control field of each data frame.

Therefore, according to one advantageous refinement of the exemplary embodiments and/or exemplary methods of the present invention it is proposed that the calibration control system is suitable for measuring the distance (NOPN) between the first edge occurring in the data field of the received data frame, and the other edge in a field of the received data frame. Thus, according to this refinement not just any edge in the data field of the received data frame, but, rather, the first edge, is used.

According to one specific embodiment of the present invention, it is proposed that the calibration control system is suitable for measuring the distance (NOPN) between the first edge and the other edge in a different field, in particular in a check sum field (so-called CRC field) of the received data frame. It is proposed in particular that the calibration control system is suitable for measuring the distance (NOPN) between the first edge and the last edge which occurs in the check sum field of the received data frame. Of course, an edge other than the last edge, for example the next to last edge, could be used in the check sum field for the calibration. Using the first edge in the data field of the received data frame and/or the last edge in the check sum field of the received data frame results in a particularly large distance between the edges which are considered, and thus results in greater accuracy of the calibration. The relative measuring error in the detection of the oscillator clock signal is lower.

According to another specific embodiment of the present invention, it is proposed that the calibration control system is suitable for measuring the distance (NOPN) between the first edge from recessive to dominant, and the other edge from recessive to dominant, in a field of the received data frame. Use of the edges from recessive to dominant has the advantage that these edges are usually sharper and steeper than the edges from dominant to recessive, so that the point in time of the edge may be measured with greater accuracy. The levels on a CAN bus are, for example, "0" for dominant and "1" for recessive. For a CAN bus, according to this specific embodiment the edges from "1" to "0" would thus be taken into account.

According to another advantageous refinement of the present invention, it is proposed that, during receipt of the calibration message and during calibration of the imprecise oscillator, the data bus protocol control system of the at least one user having the imprecise oscillator is kept in a restricted mode which, compared to a normal data bus mode, has limited error detection and error handling functionality with regard to the data frames received via the data bus. The restricted mode is intended to prevent a user node which is not, or is no longer, correctly calibrated from interfering with the data bus or the data transmission via error frames or other messages or actions. In particular, messages intended for the calibration are prevented from being deleted on the data bus. The setup of the communication system or the integration of a further user node into an existing communication system may thus be greatly expedited.

In some cases in which heretofore in the known SLIO CAN it was not possible at all to set up a functioning communication system, with the aid of the proposed refinement it is now possible for the first time to synchronize the user nodes at all and thus set up a functioning communication system. This is particularly true for a communication system which, besides the SLIO master, only contains user nodes to be calibrated.

In the restricted mode of the protocol control system, in particular an error counter of the at least one user to be calibrated is stopped. This may apply to the error counter for transmission (Tx error counter) as well as to the error counter for reception (Rx error counter). In addition, in the restricted mode the at least one user to be calibrated and having the imprecise oscillator sends a message, in particular an acknowledgement message (acknowledge bit; ACK), when it has received an error-free data frame via the data bus. It is possible for the user to be calibrated to send an ACK bit only when it has received a data frame which may be used for calibrating the imprecise oscillator. Thus, in contrast to the SLIO nodes known from the related art, in the restricted mode it is possible for the user nodes of the communication system according to the present invention to send acknowledgement messages (ACK) although the calibration is not yet concluded. It is practically ruled out that a miscalibrated user node erroneously regards any bit stream on the bus as a valid message.

It is further proposed that in the restricted mode the destruction of a data frame which is received via the data bus and recognized as a faulty message is prevented. Thus, the user nodes of the communication system are not able to transmit active error frames and/or overload frames. A user node which specifies a system clock signal when a functioning synchronized communication system is set up for the first time is thus prevented from destroying its own data frames, which are to be used as calibration messages, due to the absence of acknowledgement messages. Another advantage is that regular data transmission via the data bus between user nodes which are already synchronized is not interfered with by a user node which is not yet, or no longer, correctly calibrated.

According to another specific embodiment of the present invention, it is proposed that only data frames which have been sent from users having a particularly precise clock generator are used for calibrating the imprecise oscillator. These are in particular users having a quartz crystal as a clock generator. The system developer is aware of the particular user nodes connected to the data bus which meet this requirement, and is therefore able to appropriately configure or program the calibration control system. The particular user node from which a received data frame has been sent may be determined in the receiving user, for example on the basis of an identifier (so-called message ID in the so-called identifier field) contained in the data frame. The user nodes to be calibrated may be calibrated at particularly high accuracy using this embodiment of the present invention.

According to another embodiment of the present invention, it is proposed that only data frames which are longer than a predeterminable limiting value are used for calibrating the imprecise oscillator of the user node to be calibrated. The data field is necessarily shorter in shorter data frames than in longer data frames. Therefore, in shorter data frames the maximum distance between the two considered edges in the data field or in the check sum field is also necessarily smaller than for longer data frames. In the proposed embodiment it is provided that only data frames in which the distance between the two considered edges has a given minimum value are used for the calibration, in order to be able to carry out the calibration at a given minimum accuracy.

It is further proposed that the calibration control system is suitable for forming an average value from the measurements of the distance (NOPN) between the first edge and the other edge of multiple received data frames, and setting the clock divider as a function of this average value. Using this proposal, inaccuracies in the measurement of the distance between the considered edges may be averaged over multiple received data frames, which likewise may result in improved accuracy of the calibration.

According to another embodiment of the present invention, it is proposed that the calibration control system is suitable for requesting, via the data bus, a data frame which is usable for calibrating the imprecise oscillator, when a data frame which is error-free and usable for calibrating the imprecise oscillator is absent for a predeterminable period of time, or when the number of resynchronizations upon receipt of the data frames via the data bus exceeds a predeterminable limiting value. This embodiment ensures that in any event, the user nodes having an imprecise oscillator are calibrated from time to time in order to prevent the oscillator clock signal from changing, after extended operation of the user nodes without calibration, to the extent that the set value for the clock divider is no longer able to generate a clock signal which corresponds to the system clock signal of the data bus protocol control system of the user. In extreme cases, an excessive variation in the oscillator clock signal and lack of calibration may even result in the user node no longer being able to receive data frames via the data bus. Temperature fluctuations, supply voltage fluctuations, and aging phenomena in particular may result in fluctuations in the oscillator clock signal generated by the RC oscillator. These fluctuations in the oscillator clock signal must be compensated for by regular calibration.

According to one particularly specific embodiment of the present invention, it is proposed that the described calibration of the imprecise oscillator of the at least one user having the imprecise oscillator represents a fine calibration which is carried out subsequent to a rough calibration. According to this embodiment of the present invention, the communication system or the user nodes of the communication system, which do not have their own quartz crystal as a clock generator or have only an imprecise quartz crystal, first undergo a rough calibration. Rough calibration is carried out in particular upon start-up of the communication system, or when one or multiple user nodes is/are to be integrated into an existing communication system. Rough calibration first of all allows the users to receive data frames at all via the data bus. Fine calibration is then carried out in the above-described manner, based on the received or selected received data frames.

The calibration control system for rough calibration of the imprecise oscillator is advantageously suitable for searching the received data frames for the smallest distance (NOP2) between two consecutive edges in oscillator periods, using the distance (NOP2) as the time for two bit times, and setting the clock divider in such a way that a system clock signal period has a length of NOP2/(2·NTQ) oscillator periods. The clock divider, which generates the system clock signal of the protocol control system, is thus set in such a way that the protocol control system operates as accurately as possible using the ascertained bit time. The search for smaller distances between two consecutive edges is discontinued as soon as the protocol control system, which operates using the instantaneously set system clock signal, accepts a received data frame as a valid message, or accepts a predeterminable number of received data frames as valid messages; at this point the calibration control system is roughly calibrated. Of course, rough calibration is not limited to the use of two bit times, and may be carried out using practically any given number n of bit times. In this case, the clock divider would then be set in such a way that a system clock signal period has a length of NOP2/(n·NTQ) oscillator periods. Two consecutive edges from recessive to dominant may be considered in rough calibration, since sharper edges result for this transition, and the edges may thus be detected more accurately.

According to another refinement of the present invention, it is proposed that the communication system is designed as a CAN communication system. Data may be transmitted in this communication system, for example according to the CAN protocol. The data transmission in the CAN communication system may be carried out via the data bus according to the TTCAN protocol, which is designed as an additional protocol layer above the CAN protocol. A time-controlled deterministic transmission of the data frames via the CAN bus is made possible using the TTCAN protocol.

For a further way of achieving the object of the present invention it is proposed, based on the method for operating a communication system of the type referenced at the outset, that the number (NTQ) of system clock signals contained in a bit time may be freely configured, a distance (NOPN) between a first edge in the data field of a received data frame and another edge in a field of the received data frame is measured in oscillator periods, the number (NB) of bits between these two edges is counted, and a clock divider which generates a system clock signal of a data bus protocol control system is set in such a way that a system clock signal period has a length of NOPN/(NB·NTQ) oscillator periods.

Of course, the number (NTQ) of system clock signals contained in a bit time must be configured according to the protocol used in the communication system for the data transmission. Thus, for example, the CAN protocol allows between 4 and 25 system clock signals to be contained in a bit time. The manner in which the number (NTQ) of system clock signals contained in a bit time is configured depends on the individual case. Thus, the number (NTQ) is a function, for example, of the clock frequency of the clock generator, of the data rate at which the data are transmitted via the data bus, and—expressed in very general terms—of the physical circumstances in the communication system.

One exemplary embodiment of the present invention is explained in greater detail below with reference to the figures.

DETAILED DESCRIPTION

Figure 1:
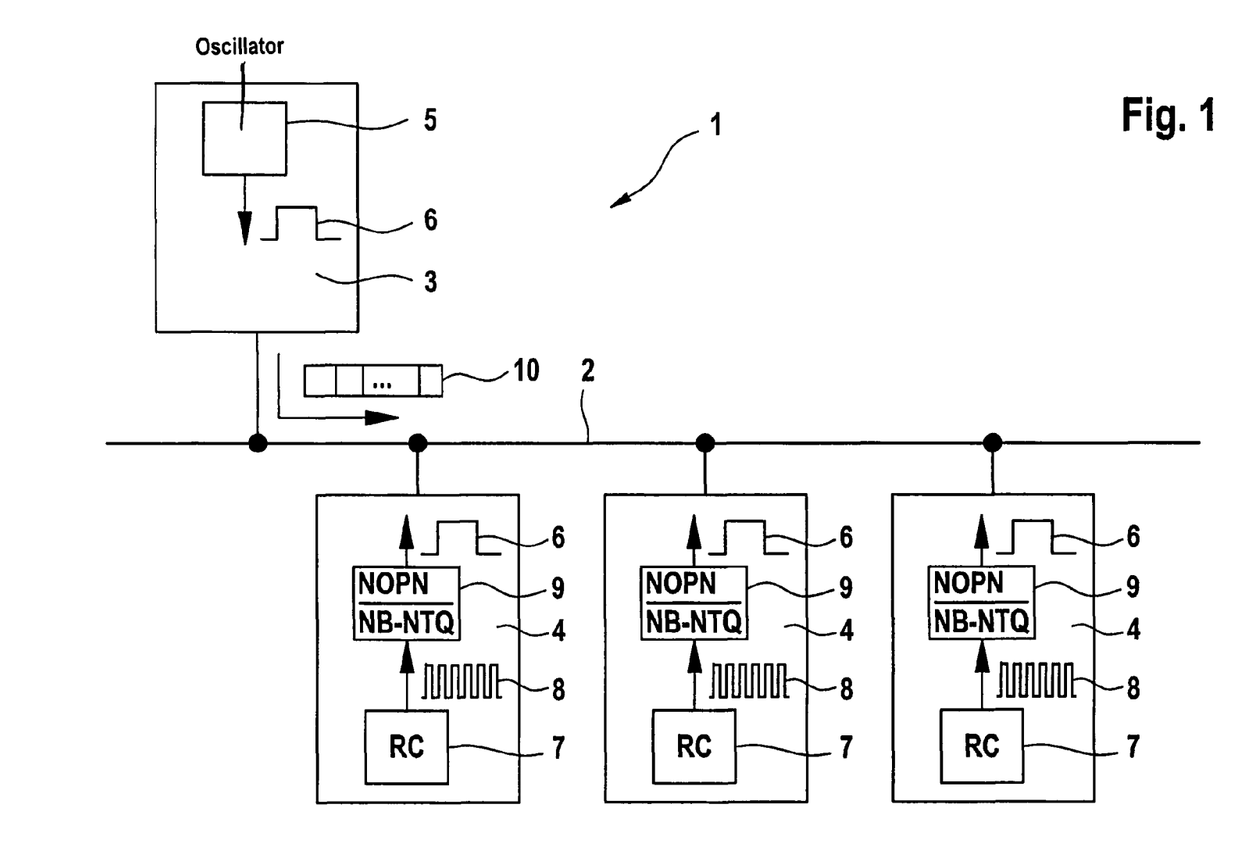
FIG. 1 shows a communication system according to the present invention, according to one specific embodiment.

A communication system according to the exemplary embodiments and/or exemplary methods of the present invention is denoted overall by reference numeral 1 in FIG. 1. The communication system includes a data bus 2 to which multiple user nodes 3, 4 are connected. User node 3 has a clock generator designed as a quartz crystal or quartz oscillator 5. This clock generator emits a clock signal 6 which corresponds to a system clock signal of data bus 2. Remaining user nodes 4 have a clock generator which is designed as an RC oscillator 7. The RC oscillator sends an oscillator clock signal 8 which is different from system clock signal 6. For this reason, oscillator clock signal 8 must first be converted to system clock signal 6, using a clock divider 9. The divider ratio of clock divider 9 is set within the scope of a calibration of user nodes 4; users 4 are synchronized to system clock signal 6 of data bus 2.

The communication system illustrated in FIG. 1 has the advantage over conventional communication systems, in which each user node usually has its own quartz crystal or quartz oscillator as a clock generator, that communication system 1, in particular user nodes 4, may have a particularly simple and cost-effective design. Communication system 1 is particularly suited for simpler applications, for example in motor vehicles, aircraft, air vehicles, or machine tools, in which average data transmission rates in the range of 250 kbits, for example, are sufficient. Of course, using an appropriate design, even higher data rates may be achieved using the communication system according to the present invention. Communication system 1 is configured as a controller area network (CAN) communication system, for example, the data being transmitted in data frame 10 via CAN bus 2 according to a CAN protocol. The data may be transmitted via CAN bus 2 according to the time-triggered CAN (TTCAN) protocol, which is designed as an additional protocol layer on the CAN protocol and which allows a time-controlled, deterministic data transmission via CAN bus 2.

When communication system 1 having multiple user nodes 3, 4 connected thereto is started up, or when one of user nodes 4 is integrated into existing communication system 1, for example after a reset or for the first-time integration into communication system 1, it is necessary to set the divider ratio of clock dividers 9 in such a way that system clock signal 6 of data bus 2 is generated from oscillator clock signal 8. Thus, user node or nodes 4 having an RC oscillator 7 must be synchronized to system clock signal 6, which is carried out within the scope of a calibration. Since oscillator signal 8 of RC oscillators 7 may be subjected to extreme fluctuations during operation of communication system 1, user nodes 4 must also be synchronized from time to time during continuous operation of communication system 1; i.e., user nodes 4 must go through a calibration phase also during operation of communication system 1. Variation in oscillator clock signal 8 may be caused by temperature fluctuations, supply voltage fluctuations, or aging phenomena.

User nodes 4 are calibrated on the basis of calibration messages which are transmitted via data bus 2. These calibration messages are received by user or users 4 and used for calibrating RC oscillator 7 to system clock signal 6 of data bus 2. According to the exemplary embodiments and/or exemplary methods of the present invention, completely normal messages, i.e., practically all data frames 10, may be used as calibration messages. Thus, special calibration messages having a special identification (ID) and/or special payload data are not needed for calibrating users 4.

Two options for a design of data frames 10 are explained in greater detail below with reference to FIGS. 2 and 3, using the example of various CAN data frames. Of course, data frames 10 used for calibrating users 4 according to the present invention may also have a design which differs from that illustrated in FIGS. 2 and 3. In particular, the number, type, and design of the various fields of a data frame 10 in the region of the so-called header preceding a data field containing payload data, and in the region of a so-called trailer following the data field, may differ from the design shown in FIGS. 2 and 3.

The data are transmitted via data bus 2 in such a way that a bit, depending on the state, acts on the lines of data bus 2 in either a dominant or a recessive manner. A dominant bit overwrites a recessive bit. For CAN, "0" is dominant and "1" is recessive. Data frame 10 is also referred to as a frame. There are four different types of frames in CAN:
    a data frame is used for transporting up to 8 bytes (64 bits) of payload data;
    a remote frame is used for requesting a data frame from another user 3, 4;
    an error frame signals to all users 3, 4 a recognized error condition in the transmission;
    an overload frame is used as a forced pause between data frames and remote frames which follow one another in rapid succession.

Figure 2:
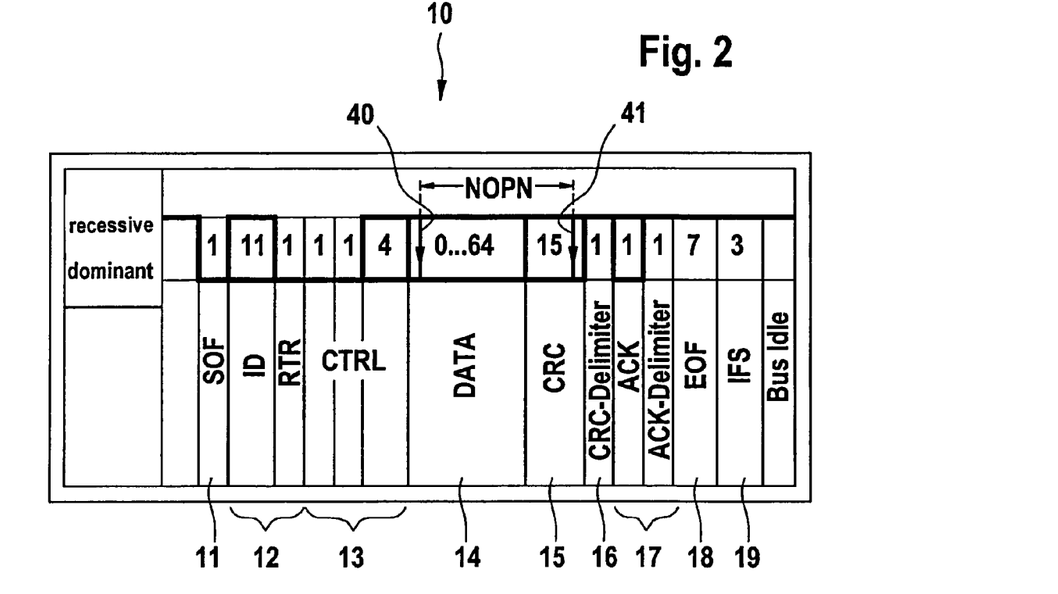
FIG. 2 shows the design of a CAN data frame.
Figure 3:
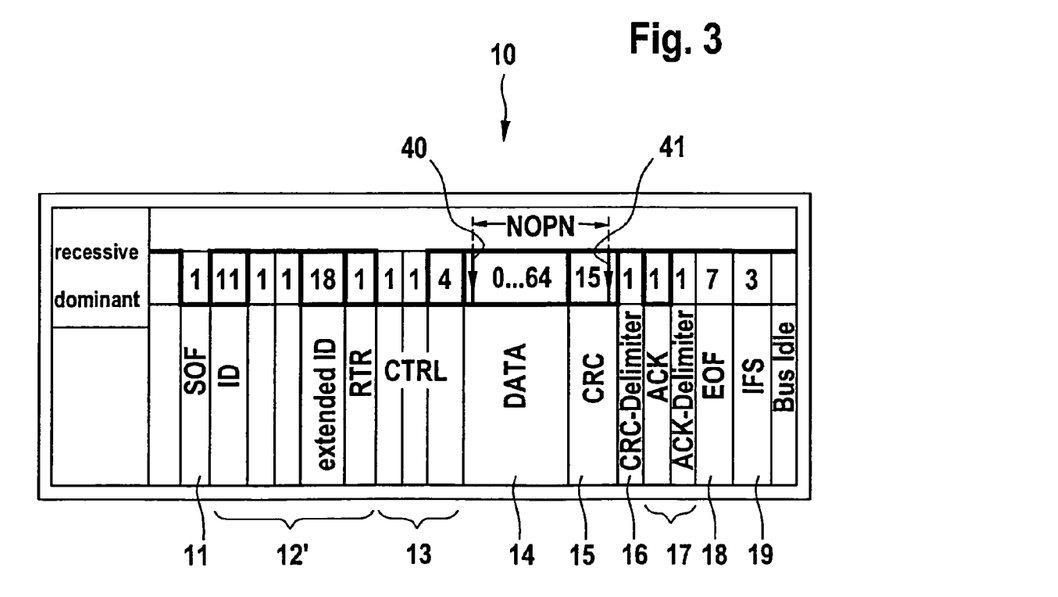
FIG. 3 shows the design of an extended CAN data frame.

FIGS. 2 and 3 illustrate examples of the design of data frames 10. A data frame 10 has the following logical design:
    start of frame (SOF) 11, includes one dominant bit;
    arbitration field 12, composed of an identifier segment (11 bits) plus a remote transmission request (RTR) bit;
    control field (CTRL) 13, includes 6 bits;
    data field (DATA) 14 for transmitting the payload data, includes 0 to 64 bits in units of 8 bits per 1 byte;

check sum field (CRC), includes 16 bits (15-bit CRC sequence 15 plus one recessive CRC delimiter bit 16);
acknowledgment field (ACK) 17, includes 2 bits composed of one ACK slot plus one recessive ACK delimiter;
end of frame (EOF) 18, includes 7 bits (recessive);
intermission (intermission frame space (IFS)) 19, includes 3 bits, corresponds to the minimum number of bits which separate consecutive messages.

In so-called extended data frame 10 (extended frame) illustrated in FIG. 3, arbitration field 12' includes an identifier segment having 29 plus 2 bits, plus 1 RTR bit.

Otherwise, data frame 10 from FIG. 3 has the same design as data frame 10 from FIG. 2.

Figure 4:
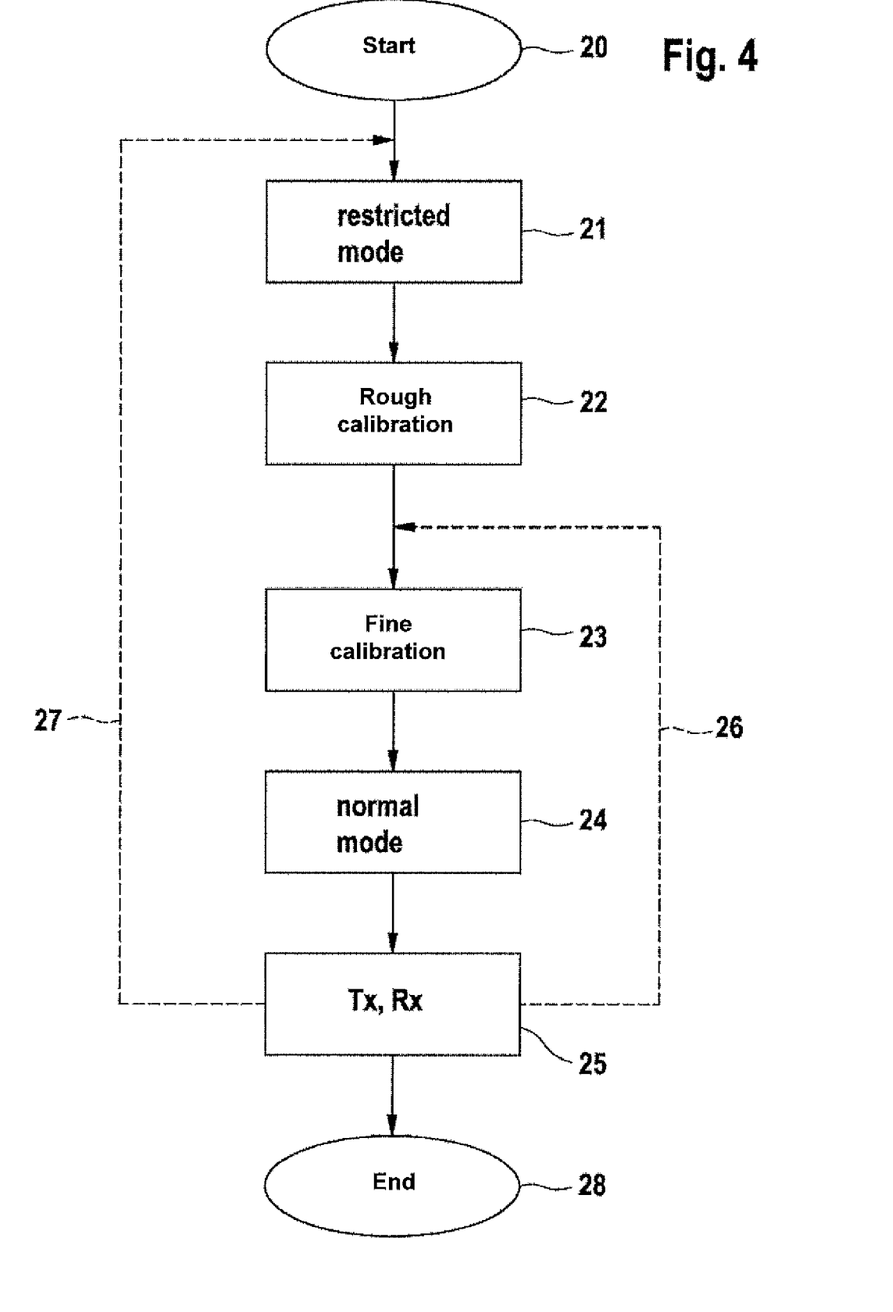
FIG. 4 shows a flow chart of a method according to the present invention for operating a communication system according to one specific embodiment.

FIG. 4 illustrates a flow chart of a method according to the present invention for operating a communication system 1 according to one exemplary embodiment. The method is carried out in communication system 1, which is started up as a whole. Alternatively, the method is carried out only in one or multiple user nodes 4 which is/are to be integrated into a previously established and synchronized communication system 1. Integration of a user node 4 into an existing communication system 1 is necessary, for example, when user node 4 is temporarily excluded from communication system 1 due to a reset, or if user node 4 is reconnected to data bus 2 as an additional node.

The method begins in a method step 20. The frequency of internal RC oscillator 7 is not precisely known at the start. A variable NTQ is configured in advance, and establishes the number of system clock signals (so-called CAN time quanta) $t_q$ which are to be contained in a CAN bit time. According to CAN protocol, between 4 and 25 time quanta may be contained in a bit time. The divider ratio to be set in clock divider 9 between oscillator period 8 and system clock signal period 6 must be ascertained and set. Fractional rational divider ratios are also possible according to the exemplary embodiments and/or exemplary methods of the present invention.

In a subsequent method step 21, user or users 4 of communication system 1 or the CAN protocol control system of user or users 4 is/are switched to a restricted mode which, compared to a normal mode, has limited error detection and error handling functionality with regard to data frames 10 received via data bus 2. In particular in the restricted mode, a transmission (transmit; Tx) and/or a reception (receive; Rx) error counter of the at least one user 4 is/are stopped. Thus, the error counter itself is not incremented or decremented when the protocol control system has observed a faulty message on data bus 2. The intent is to prevent a user node 4 which is not yet, or is no longer, correctly calibrated from interfering with data bus 2 via error frames or other actions. In the restricted mode a user node 4 may send only an acknowledgement message (acknowledge bit; ACK). Of course, this bit is sent only when node 4 has observed an error-free message on bus 2. It is practically ruled out that a miscalibrated user node 4 erroneously regards any bit stream as a valid message.

Thus, communication system 1 according to the present invention differs from the SLIO CAN known from the related art, in which, prior to fine calibration, the users are not able to send any acknowledgement messages (ACK) concerning the start-up of a network which, of all of the SLIO user nodes, contains only one other SLIO master node. Thus, the switchover of user nodes 3, 4 to restricted mode during calibration of user node 4 greatly simplifies and expedites the start-up of communication system 1 according to the present invention.

In a method step 22, first the rough calibration of user 4 is then carried out. A calibration control system of user 4 starts by searching the received bit patterns on CAN bus 2 for the smallest distance between two consecutive edges from recessive to dominant (measured in oscillator periods 8). This distance NOP2 is assumed to be the time for two CAN bit times, and clock divider 9, which generates system clock signal 6 of the CAN protocol control system, is set in such a way that the CAN protocol control system operates in the most precise manner possible using this CAN bit time. Thus, clock divider 9 is set in such a way that a system clock signal period has a length of NOP2/(2·NTQ) oscillator periods. The calibration control system searches for smaller distances between two consecutive edges from recessive to dominant until the CAN protocol control system, which operates with instantaneously set system clock signal 6, accepts a received CAN message as valid. The calibration control system is roughly calibrated in this way. Roughly calibrated user 4 is able to receive data frames 10 via data bus 2.

A fine calibration of user 4 is then carried out in a method step 23. This is explained in detail below with reference to FIG. 5. Finely calibrated user node 4 is not only able to receive data frames 10 via data bus 2, but is also able itself to send data frames 10 via data bus 2. Following fine calibration, communication system 1 enters a normal mode, which is illustrated by method step 24 in FIG. 4. During normal mode, users 3, 4 of communication system 1 may exchange messages in a manner known per se according to the CAN protocol or any other given protocol used for data transmission via data bus 2 (see method step 25). A calibration phase must also be passed through from time to time during normal operation of communication system 1, as illustrated by dashed-line arrow 26. Fine calibration of user 4 in method step 23 may be carried out cyclically at regular intervals, or in an event-driven manner as needed. Likewise, it may be necessary from time to time to carry out the entire calibration, including rough calibration 22 and fine calibration 23, as illustrated by dashed-line arrow 27.

When the data transmission in communication system 1 is completed and communication system 1 is again shut down, at the end of the method according to the present invention a transition is made to method step 28.

The protocol control system of user 4 may be kept in the restricted mode until fine calibration is concluded. However, for carrying out the fine calibration it is not a requirement that the protocol control system be in the restricted mode. As previously stated, the restricted mode is particularly important for rough calibration at the start of the calibration process, since due to the restricted mode the setup of communication system 1 and the integration of a user node 4 into an existing communication system 1 may be greatly simplified and expedited during rough calibration. Only in the restricted mode is the protocol control system able, even before completion of fine calibration, to transmit an acknowledgement message (ACK) to sender 3 of the calibration message. At the same time, the protocol control system of user 4 is not able to destroy a message as the result of an active error flag, and is not able to send any other message as an acknowledgement message. In addition, during the restricted mode it is also not possible to place the protocol control system in the error passive state or a bus off state as the result of misunderstood messages, since the error counter is "frozen" in the restricted mode. The protocol control system is returned to normal mode, which may be after conclusion of fine calibration (see method step 25 in FIG. 4).

Figure 5:
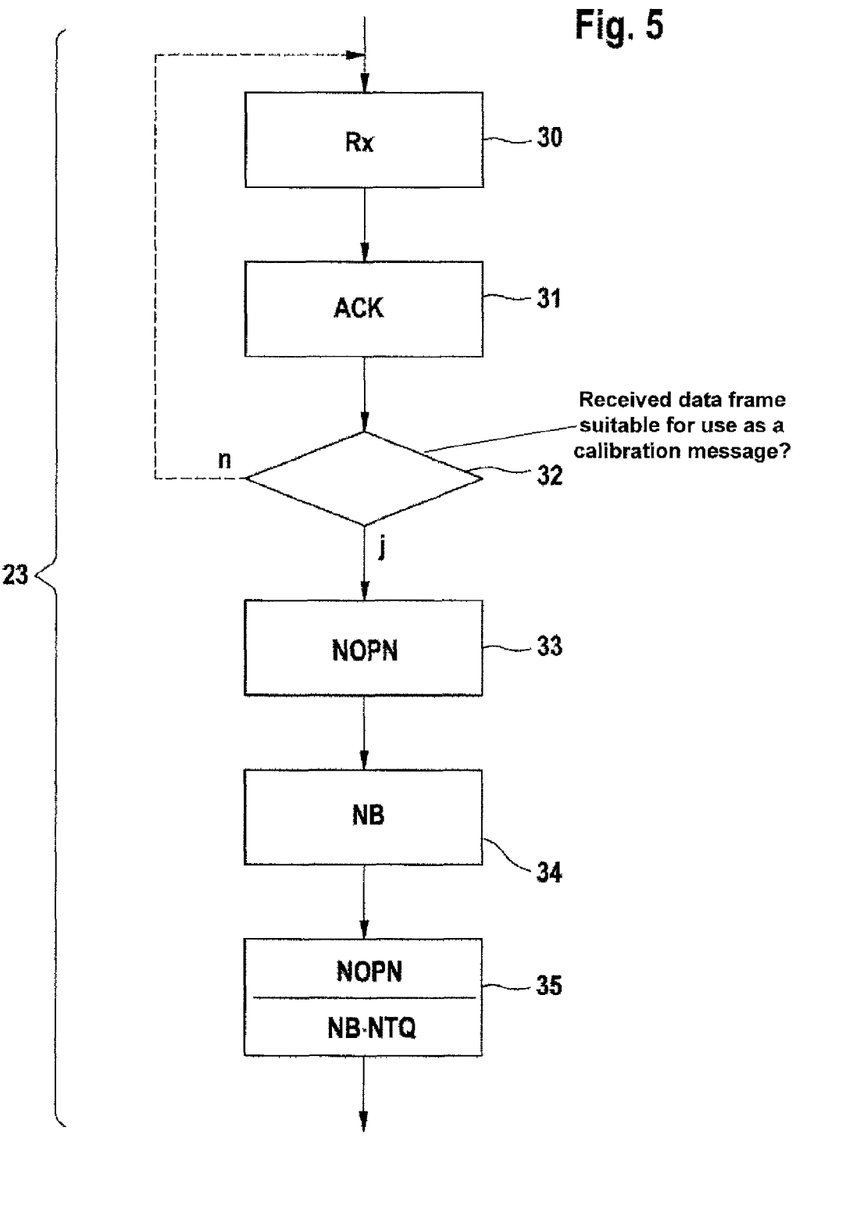
FIG. 5 shows a flow chart of a fine calibration of a user node of the communication system from FIG. 1.

The method according to the present invention, in particular fine calibration of user 4, is explained in greater detail below with reference to FIG. 5. In a first method step 30 of the fine calibration sequence the protocol control system of user 4 receives data frames 10 via data bus 2. For each error-free received CAN message, an acknowledgement message (ACK bit) is sent in a subsequent method step 31. This acknowledgement message is received by the user node 3 which sent the calibration message that was received in step 30.

In a query step 32, a check is then made as to whether received data frame 10 is suitable for use as a calibration message. Examples of unsuitable messages include messages which come from a user 3, 4 of communication system 1 for which it is known that the clock signal of the user is less precise, for example from another user node 3 having an RC oscillator 7. Only data frames 10 of users 3 having a quartz oscillator 5 may be used as calibration messages. To allow a determination of from which of users 3, 4 a received data frame comes, a system programmer must develop a list of identifiers (ID) and add the configuration parameters of user node 3, 4. The subsequent fine calibration may also be limited to messages which are longer than a predeterminable minimum length. The length of a message may be taken from a data length field 4 bits in length which is part of control field (CTRL) 13 of data frame 10. When the messages which are used for fine calibration are limited to particularly long messages, the number NB of bits between the two considered edges 40, 41 from recessive to dominant is particularly large. The described method for fine calibration is more accurate the larger the number NB of bits between the two considered edges 40, 41, since for large values of number NB the effect of the measuring error of an oscillator period 8, expressed as a percentage, is less. In any event, fine calibration should be used only for error-free received messages.

In the event that received data frame 10 is not suitable as a calibration message, the message in receiving user node 4 is evaluated for content and further processed. However, the message is not used for calibrating user 4. The method then branches once again to method step 30, and a message is received once again via data bus 2. Depending on the requirements for clock signal tolerance, this filtering (query 32) of data frames 10 which are less suitable or are not suitable at all as a calibration message may also be dispensed with.

In a method step 33, the calibration control system of user 4 measures in oscillator periods 8 distance NOPN between a first edge 40 (see FIGS. 2 and 3) from recessive to dominant in data field 14 (or in control field 13) and a last edge 41 (see FIGS. 2 and 3) from recessive to dominant in CRC field 15 in received data frame 10, and in a subsequent method step 34 counts the number NB of bits between these two edges 40, 41. If system clock signal 16 still deviates slightly from its ideal value after rough calibration, within the scope of fine calibration individual bits are lengthened or shortened by resynchronization. The product of the number NB of bits between the two edges 40, 41 and the number NTQ of system clock signals in a bit time indicates the number of system clock signal periods 6 that would have been counted if the system clock signal 6 operated at its setpoint frequency. In a method step 35, clock divider 9 is then set in such a way that a system clock signal period has a length of NOPN/(NB·NTQ) oscillator periods 8. The calibration control system is then fine-calibrated; the fine calibration is thus concluded.

What is claimed is:

1. A communication system, comprising:
 a data bus;
 multiple user nodes connected to the data bus, data transmission taking place via the data bus in data frames, wherein each data frame including at least one of at least one data field, at least one control field and at least one check sum field, at least one of the users having a high-precision clock generator and the remaining users having a lower precision clock generator, wherein the lower precision clock generator is less precise than the high-precision clock generator, and during operation calibration messages being present on the data bus, and at least one of the users, which has the lower precision clock generator, receiving a calibration message; and
 a calibration control system for calibrating the lower precision clock generator to a system clock signal of the data bus, taking into account information contained in the received calibration message, wherein a number of system clock signals contained in a bit time may be configured, and wherein the calibration control system is for measuring in oscillator periods a distance between a first edge of an oscillator period in the data field or in the control field of a received data frame and another edge of the oscillator period in a field of the received data frame, counting the number of bits between the two edges, and setting a clock divider, which generates a system clock signal of a data bus protocol control system of the at least one user having the lower precision clock generator, so that a system clock signal period has a length of oscillator periods equal to the distance between a first edge of the oscillator period in the data field or in the control field of a received data frame and another edge of the oscillator period in a field of the received data frame divided by the product of the number of bits between the two edges and the number of system clock signals contained in a bit time.

2. The communication system of claim 1, wherein the calibration control system is for measuring the distance between the first edge of the oscillator period occurring in the data field or in the control field of the received data frame, and the other edge of the oscillator period occurring in the same field as the first edge.

3. The communication system of claim 1, wherein the calibration control system is for measuring the distance between the first edge of the oscillator period occurring in the data field or in the control field of the received data frame, and the other edge of the oscillator period occurring in a different field, in particular in a check sum field of the received data frame.

4. The communication system of claim 3, wherein the calibration control system is for measuring the distance between the first edge of the oscillator period and the last edge of the oscillator period, which occurs in the check sum field of the received data frame.

5. The communication system of claim 1, wherein the calibration control system is for measuring the distance between the first edge of the oscillator period from recessive to dominant, and the other edge of the oscillator period from recessive to dominant.

6. The communication system of claim 1, wherein during receipt of the calibration message and during calibration of the lower precision clock generator, the data bus protocol control system of the at least one user having the lower precision clock generator is kept in a restricted mode which, compared to a normal data bus mode, has limited error detection and error handling functionality with regard to the data frames received via the data bus.

7. The communication system of claim 6, wherein in the restricted mode an error counter of the at least one user having the lower precision clock generator is stopped.

8. The communication system of claim 6, wherein in the restricted mode a destruction of a data frame which is received via the data bus and recognized as a faulty message is prevented.

9. The communication system of claim 6, wherein in the restricted mode the at least one user having the lower precision clock generator sends a message, in particular an acknowledgement message, when it has received an error-free data frame via the data bus.

10. The communication system of claim 1, wherein only data frames which have been sent from users having a particularly precise clock generator are used for calibrating the lower precision clock generator.

11. The communication system of claim 1, wherein only data frames which are longer than a predeterminable limited value are used for calibrating the lower precision clock generator.

12. The communication system of claim 1, wherein the calibration control system is for forming an average value from the measurements of the distance between the first edge of the oscillator period and the other edge of the oscillator period of multiple received data frames, and setting the clock divider as a function of this average value.

13. The communication system of claim 1, wherein the calibration control system is for requesting, via the data bus, a data bus, a data frame which is for calibrating the lower precision clock generator, when a data frame which is error-free and usable for calibrating the lower precision clock generator fails to appear for a predeterminable period of time, or when a number of resynchronizations upon receipt of the data frames via the data bus exceeds a predeterminable limiting value.

14. The communication system of claim 1, wherein the calibration of the lower precision clock generator of the at least one user having the lower precision clock generator represents a fine calibration which is carried out subsequent to a rough calibration.

15. The communication system of claim 14, wherein the calibration control system for rough calibration of the lower precision clock generator is for searching the received data frames for the smallest distance between two consecutive edges in oscillator periods, using the smallest distance as the time for two bit times, and setting the clock divider so that a system clock signal period has a length of oscillator periods equal to: the smallest distance between the two consecutive edges in oscillator periods divided by the product of the two and the number of system clock signals contained in a bit time.

16. The communication system of claim 15, wherein the calibration control system for rough calibration of the lower precision clock generator is for searching the received data frames for the smallest distance between two consecutive edges from recessive to dominant in oscillator periods, using the smallest distance as the time for two bit times, and setting the clock divider so that a system clock signal period has a length of oscillator periods equal to the smallest distance between the two consecutive edges in oscillator periods divided by the product of the two and the number of system clock signals contained in a bit time.

17. The communication system of claim 14, wherein rough calibration is terminated as soon as the data bus protocol control system, which operates using an instantaneous roughly set system clock signal, accepts a received data frame as a valid message.

18. The communication system of claim 1, wherein the communication system is configured as a Controller Area Network communication system.

19. The communication system of claim 18, wherein the data transmission is carried out via Controller Area Network bus according to the Time Triggered Controller Area Network protocol.

20. A method for operating a communication system, the method comprising:

during operation, transmitting calibration messages via a data bus, the communication system including includes the data bus and multiple user nodes connected to the data bus, data being transmitted via the data bus in data frames, each including at least one of at least one data field, at least one control field, at least one check sum field, at least one of the users having a high-precision clock generator and the remaining users having a lower precision clock generator, wherein the lower precision clock generator is less precise than the high-precision clock generator;

at least one of the users, which has the lower precision clock generator, receiving a calibration message, and calibrating the lower precision clock generator to a system clock signal of the data bus, taking into account information contained in the received calibration message, wherein the number of the system clock signals contained in a bit time may be configured; and measuring a distance between a first edge of the oscillator period in the data field or in the control field of a received data frame and another edge of the oscillator period in a field of the received data frame is measured in oscillator periods, the number of bits between these two edges is counted, and a clock divider, which generates a system clock signal of a data bus protocol control system, is set so that a system clock signal period has a length of oscillator periods equal to the distance between a first edge of the oscillator period in the data field or in the control field of a received data frame and another edge of the oscillator period in a field of the received data frame divided by the product of the number of bits between the two edges and the number of system clock signals contained in a bit time.

* * * * *

UNITED STATES PATENT AND TRADEMARK OFFICE
CERTIFICATE OF CORRECTION

PATENT NO. : 8,391,318 B2
APPLICATION NO. : 12/735952
DATED : March 5, 2013
INVENTOR(S) : Florian Hartwich Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 136 days.

Signed and Sealed this
First Day of September, 2015

Michelle K. Lee
*Director of the United States Patent and Trademark Office*